B. A. WANDERSEE.
HARROW.
APPLICATION FILED JULY 13, 1910.

973,730.

Patented Oct. 25, 1910.
2 SHEETS—SHEET 2.

Witnesses

Inventor
B. A. Wandersee
By
Attorneys

UNITED STATES PATENT OFFICE.

BERNHARD A. WANDERSEE, OF MONTROSE, MINNESOTA.

HARROW.

973,730.      Specification of Letters Patent.      Patented Oct. 25, 1910.

Application filed July 13, 1910. Serial No. 571,801.

*To all whom it may concern:*

Be it known that I, BERNHARD A. WANDERSEE, a citizen of the United States, residing at Montrose, in the county of Wright, State of Minnesota, have invented certain new and useful Improvements in Harrows; and I do hereby declare the following to be a full, clear, and exact description of the invention, such as will enable others skilled in the art to which it appertains to make and use the same.

This invention relates to agricultural implements and has special reference to a harrow.

One object of the invention is to improve the construction of a harrow so that the adjustment of the teeth or blades at different angles to the soil may be readily accomplished without undue exertion on the part of the operator.

With the above and other objects in view the invention consists in general of a novel form of harrow embodying a frame, toothed bars hingedly connected to said frame, traction arms projecting downward from said toothed bars, draft links connecting the lower ends of said traction arms and means for varying the position of the toothed bars with respect to the frame and holding them in such position when adjusted.

The invention further consists in certain novel details of construction and combination of parts hereinafter fully described, illustrated in the accompanying drawings, and specifically set forth in the claims.

In the accompanying drawings, like characters of reference indicate like parts in the several views.

Figure 1:
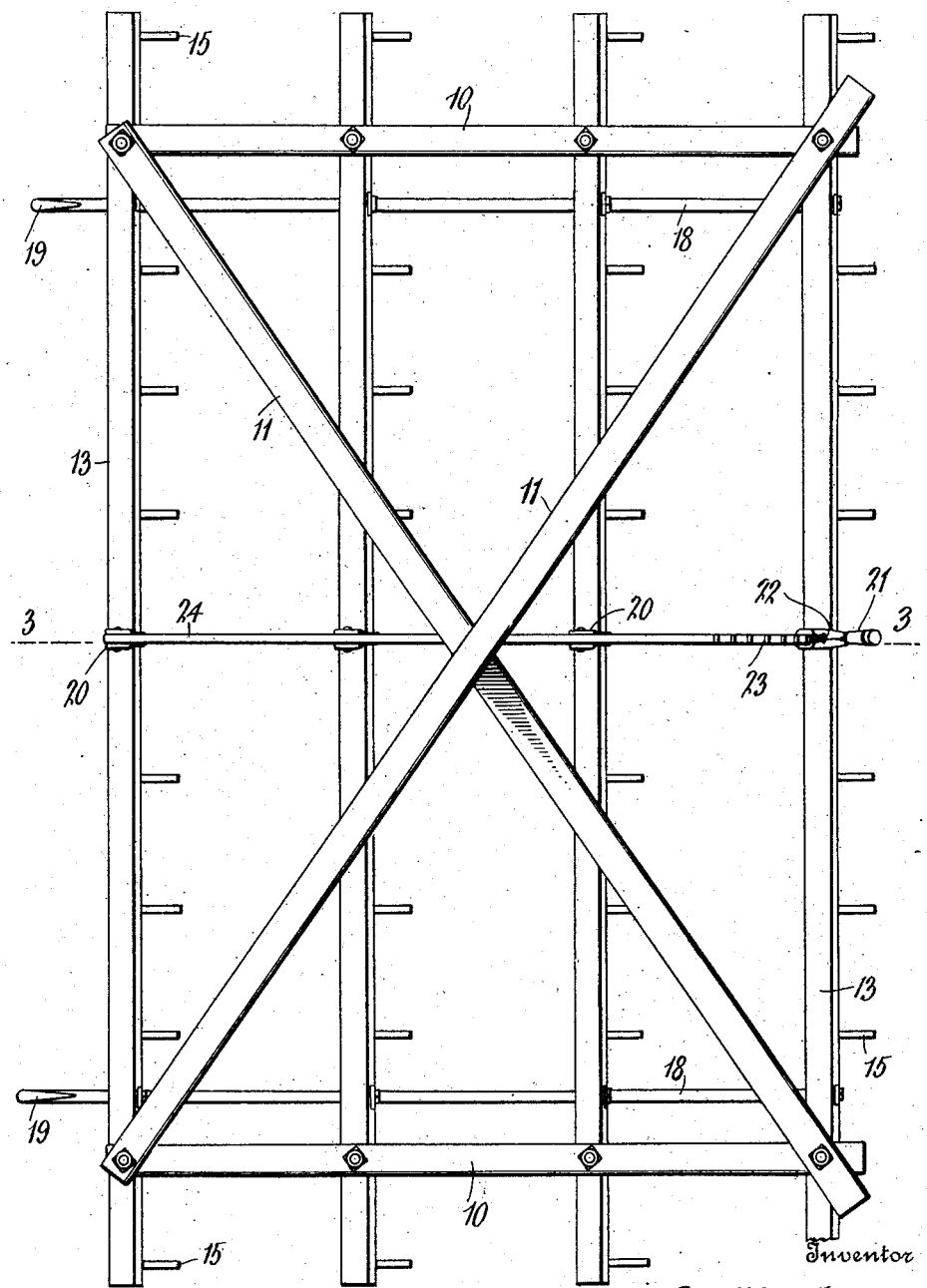
Figure 2:
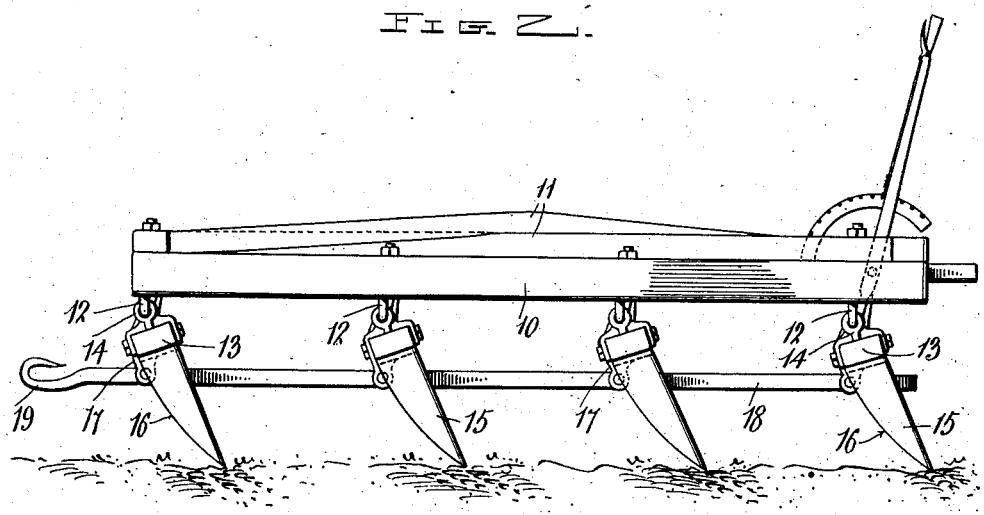
Figure 3:
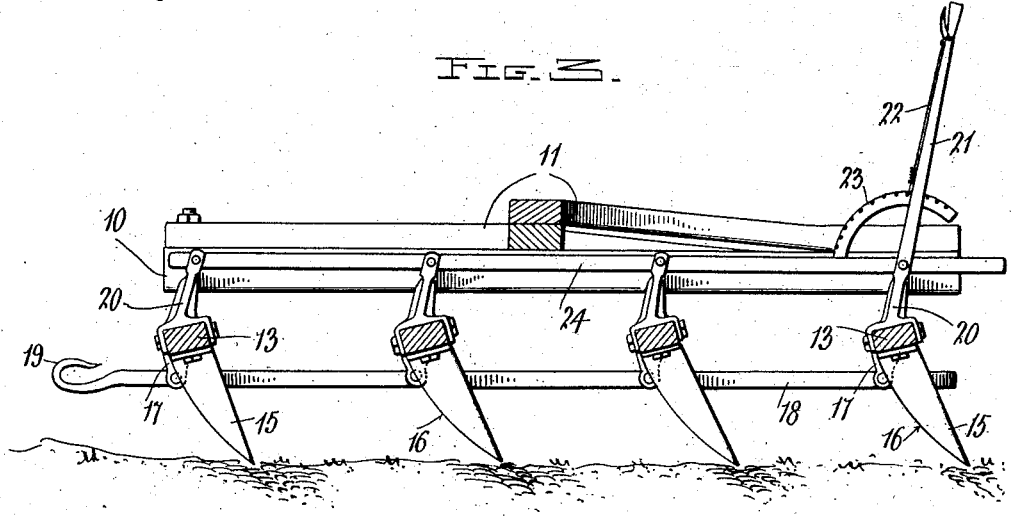

Figure 1 is a plan view of a harrow constructed in accordance with this invention; Fig. 2 is a side elevation of such a harrow; Fig. 3 is a section through such a harrow on the line 3—3 of Fig. 1.

The frame of this harrow comprises longitudinal members 10 which constitute the sides of the frame and diagonal brace members 11. The members 10 are provided with downwardly projecting eye-bolts 12 arranged in spaced relation along each member, the eye-bolts on one member being opposite to those on the other.

At 13 are indicated the toothed bars of the harrow and these bars are connected to the eye bolts 12 by other eye-bolts 14, the connections thus forming a species of hinge so that these bars are hingedly connected to the under side of the harrow frame. Extending downwardly from the bars 13 are harrow teeth 15 each of which is in the form of a flat knife blade having a curved cutting edge as at 16. Between certain of the teeth 15 the bars 13 are provided with downwardly extending traction arms 17 which are preferably adjacent the ends of the bars 13. These traction arms are connected by links 18, there being one link for each set of the arms 17. Each of the links 18 is provided with a clevis in the form of a hook 19 for the purpose of attaching the draft animals. It is to be observed that these hooks 19 are formed on those ends of the links toward which the cutting edges 16 face so that the action of the draft animals tends to pull the points of the teeth forward with respect to the frame and thus cause them to penetrate the ground to a greater depth than when they slant backward. Extending upward from each of the bars 13 is an adjusting arm 20 and one of these adjusting arms is extended as at 21 to form a lever which is provided with a latch 22 coöperating with a quadrant 23 fixed upon the frame. These arms 20 are furthermore connected by means of an adjusting link 24.

In the operation of the device it will be noted that the relative positions of the bars 13 and the frame are capable of very easy adjustment since the tendency of the pull on the clevises 19 is to straighten the teeth up with respect to the ground so that the rearward pull on the lever 21 necessary to accomplish this is but very slight, the draft animals themselves doing most of the work. Furthermore, the positioning of the teeth at an angle to the ground can be readily accomplished by moving the lever 21 forward since the weight of the frame will easily permit such action, both of these operations being capable of being performed while the device is in use.

There has thus been provided a simple and efficient device of the kind described and for the purpose specified.

Having thus described the invention, what is claimed as new is:

1. In a harrow, a frame, tooth bars hingedly connected to said frame, knife teeth projecting downward from said tooth bars, one edge of each tooth constituting a cutting edge, traction arms projecting downward from said tooth bars, draft links connecting the lower ends of said traction arms, and clevises on those ends of said links toward which the edges of said knife teeth face.

2. In a horrow, a frame, tooth bars hingedly connected to said frame, adjusting arms projecting upwardly from said bars, an adjusting link connecting said adjusting arms, one of said arms being continued upward to form a lever, a latch on said lever, a quadrant on said link coöperating with said latch, a series of knife teeth projecting downward from said bars, one edge of each tooth constituting a cutting edge, traction arms projecting downward from said tooth bars, draft links connecting the lower ends of said traction arms, and clevises on those ends of the traction links toward which the edges of said knife teeth face.

In testimony whereof, I affix my signature, in presence of two witnesses.

BERNHARD A. WANDERSEE.

Witnesses:
E. W. SWANSON,
EDWIN MILLER.